United States Patent [19]

Sun

[11] Patent Number: 4,612,348

[45] Date of Patent: Sep. 16, 1986

[54] RUBBER CONCENTRATE, POLYMER BLENDS BASED THEREON AND METHODS FOR MAKING SAME

[75] Inventor: Yun C. Sun, Midland, Mich.

[73] Assignee: The Dow Chemical Company, Midland, Mich.

[21] Appl. No.: 681,397

[22] Filed: Dec. 13, 1984

[51] Int. Cl.$^4$ .................. C08L 51/04; C08L 55/02
[52] U.S. Cl. .......................... 525/86; 525/71; 525/98; 525/99; 525/193
[58] Field of Search .................. 525/193, 86

[56] References Cited

U.S. PATENT DOCUMENTS

| | | | |
|---|---|---|---|
| 3,576,910 | 4/1971 | Jastrzebski | 525/193 |
| 3,607,981 | 9/1971 | Morris | 525/193 |
| 3,607,983 | 9/1971 | Rushton et al. | |
| 4,012,462 | 3/1977 | Chaudhary | |
| 4,042,647 | 8/1977 | Cornell | |
| 4,157,361 | 6/1979 | Cornell | 525/193 |
| 4,221,681 | 9/1980 | Campbell et al. | |
| 4,233,418 | 11/1980 | Lingier et al. | |
| 4,267,283 | 5/1981 | Whitehead | |
| 4,287,318 | 9/1981 | Bracke et al. | |
| 4,393,171 | 7/1983 | Bracke et al. | |

FOREIGN PATENT DOCUMENTS 42-7690  3/1967  Japan .................................. 525/193

*Primary Examiner*—Wilbert J. Briggs, Sr.
*Attorney, Agent, or Firm*—James A. Mitchell

[57] ABSTRACT

The specification discloses a method for forming a rubber concentrate which can be incorporated in relatively high percentages into rubber reinforced polymers without adversely affecting processability. A rigid polymer forming monomer system is polymerized in the presence of a mixture of a low molecular weight rubber (weight average molecular weight of from about 2,000 to about 50,000) and a higher molecular weight rubber (weight average molecular weight of from about 100,000 to about 400,000). The resulting rubber concentrate can be incorporated into a rigid polymer blend which is compatible with the rigid polymer forming monomer phase of the rubber concentrate. The resulting new composition has significantly improved impact strength and acceptable processability.

22 Claims, No Drawings

RUBBER CONCENTRATE, POLYMER BLENDS BASED THEREON AND METHODS FOR MAKING SAME

BACKGROUND OF THE INVENTION

This invention relates to rubber concentrates and polymer blends based thereon. Rubber concentrates are often blended or copolymerized with polymers to increase the impact strength of the resulting polymer composition. ABS and impact polystyrene are examples of such polymer compositions.

One limit on the continued addition of rubber to such compositions is that the viscosity of the composition increases excessively. A high viscosity polymer composition is too difficult to process.

Additionally, increasing rubber content also becomes marginally less effective because of particle size limitations. In an ABS, for example, the rubber particles should have a particle size of approximately 0.7 microns in order to maximize impact strength. As one adds more rubber to the ABS composition, it becomes more difficult to disperse the rubber in particles that small in size.

Merely using a lower molecular weight rubber does not solve these problems. While it does improve processability and make it easier to disperse the rubber into smaller particles, the resulting rubber reinforced polymer composition is not tough enough.

As a result, the typical ABS polymer composition has a rubber content of only about 15%. The maximum is usually about 20%.

U.S. Pat. No. 4,233,418 to Lingier et al., issued Nov. 11, 1980, does recognize the desirability of getting more rubber into an ABS plastic. It achieves this result by suspension polymerization, followed by melt extrusion of the resulting polymer. The patent reports ABS as having up to 30% rubber.

U.S. Pat. Nos. 3,607,983 to Rushton et al., issued Sept. 21, 1971, and 4,042,647 to Cornell, issued Aug. 16, 1977, are similar in that they attempt to increase the rubber content of ABS by polymerizing styrene and acrylonitrile monomers onto a styrene-butadiene rubber of very small particle size. In the '983 patent, it is reported that the ABS has up to 50% rubber and that the particle size of the styrene-butadiene rubber particles is from 0.05 to 2 microns. In the '647 patent, an ABS is reported having up to 45% rubber content wherein 85% of the rubber particles are said to be less than 0.14 microns.

While artisans have recognized the desirability of increasing the rubber content in rubber reinforced polymer compositions such as ABS, the above references illustrate the difficulties encountered.

SUMMARY OF THE INVENTION

The present invention is a method for making a rubber concentrate which can be incorporated in relatively high percentages into rubber reinforced polymers, with a commensurate increase in impact strength and without adversely affecting processability. A rigid polymer forming monomer system is polymerized in the presence of a mixture of a low molecular weight rubber (weight average molecular weight of 2,000 to 50,000) and a high molecular weight rubber (weight average molecular weight of 100,000 to 400,000). The resulting rubber concentrate has broad applicability in reinforcing polymer compositions.

The rigid polymer forming monomer system is selected as a function of compatibility with the polymer system with which the rubber concentrate is to be blended. For example, one aspect of the present invention involves blending the mass rubber concentrate with an ABS polymer composition to create a new composition having significantly improved impact strength with acceptable processability. For this combination, the monomers selected for the rubber concentrate are acrylonitrile and styrene. For blending with polystyrene, the monomer selected would be styrene.

These and other aspects of the invention, including the products based on the aforesaid methods, will be more fully understood and appreciated by reference to the preferred embodiment.

DESCRIPTION OF THE PREFERRED EMBODIMENT

A. Rubber Concentrate

In the preferred embodiment, a sufficient quantity of a rigid polymer forming monomer system is polymerized in the presence of a mixture of a low molecular weight rubber, having a weight average molecular weight of from about 2,000 to about 50,000, and a higher molecular weight rubber, having a weight average molecular weight of 100,000 to 400,000 to yield a rubber concentrate having from about 35 to about 90% total rubber content. The ratio of low molecular weight rubber to higher molecular weight rubber is from about 20:80 to about 80:20.

The low molecular weight rubber should have a weight average molecular weight of from about 2,000 to about 50,000. Either a pure butadiene rubber or a styrene-butadiene elastomer is operable in the present invention. The styrene-butadiene can be diblock or triblock elastomer. Excellent test results have been obtained using a liquid styrene-butadiene elastomer from Rubber Research Inc. having a weight average molecular weight of about 8,000.

The higher molecular weight rubber has a weight average molecular weight of from about 100,000 to about 400,000, with about 200,000 being preferred. The higher molecular weight rubber can be any of a number of conventional impact improvement rubbers, i.e., rubbers now typically used to improve the impact strength of rigid polymer compositions. It can be a butadiene or a styrene-butadiene di or triblock copolymer. It would also be possible to use a partially grafted rubber concentrate, but one would have to be certain that a substantial portion of the graft cites on the rubber core were still available for further grafting. Excellent test results have been obtained using a styrene-butadiene diblock copolymer having a weight average molecular weight of 200,000 and sold under the trademark "SOLPRENE 308" by Phillips Petroleum Company.

The rigid polymer forming monomer system is selected to be compatible with the polymer system with which the rubber concentrate is to be blended. For blending with an ABS polymer composition, the monomer system would consist of acrylonitrile and styrene monomers. The ratio of styrene to acrylonitrile is from about 90:10 to about 60:40. For blending with a polystyrene, the monomer system would comprise styrene. It is conceivable that other rigid polymer systems could be reinforced with the rubber concentrate of the present invention and that accordingly, alternative monomer systems would be selected for making the rubber concentrate.

The monomer system is polymerized with the low molecular weight and the high molecular weight rubbers in proportions to yield a rubber concentrate having from about 35 to about 90% total rubber (i.e., the combined total of the low molecular weight rubber and the higher molecular weight rubber). The polymerization is carried out in a conventional manner, using a solvent such as ethylbenzene and polymerizing at about 105° C. for about two hours. While it is difficult to precisely analyze the resulting mass rubber, it is believed that it contains some grafted rubber (i.e., the monomers grafted onto the rubber), involving both the high molecular weight rubber component and a probably somewhat further polymerized version of the low molecular weight component, and some free polymer or copolymer of the monomer system. For example where acrylonitrile and styrene are the monomers, it is believed that one would have a grafted styrene acrylonitrile rubber, both lower and higher molecular weight versions, and some free styrene acrylonitrile copolymer. The styrene and acrylonitrile components comprise from about 10 to about 65% of the rubber concentrate by weight while the low molecular weight and high molecular weight rubber components comprise from about 90 to about 35% by weight of the rubber concentrate. The ratio of styrene to acrylonitrile is from about 90:10 to about 60:40. The ratio of low molecular weight rubber to high molecular weight rubber is from about 20:80 to about 80:20.

B. Rubber Reinforced Rigid Polymer Blends Based on The Rubber Concentrate Of The Present Invention While the rubber concentrate described above has broad applicability, including further copolymerization applications, it has been specifically discovered that it is exceptionally well-suited to blending with rigid polymer blends. From about 5 to about 60% of the rubber concentrate is blended with from about 95 to about 45% of the rigid polymer.

In the most preferred embodiment, the rigid polymer is a conventional ABS polymer having a maximum rubber content, in the form of butadiene or a butadiene graft rubber, of from about 15 to about 20%. The specific method whereby the conventional ABS is produced does not appear critical to the present invention.

The rubber concentrate is prepared using a styrene and acrylonitrile monomer system. By blending it with a conventional ABS polymer, one can increase the rubber content by approximately 50% or more. The total rubber content is based on the percentage of rubber already present in the ABS, the percentage of the low molecular weight rubber component of the rubber concentrate and the percentage of the high molecular weight rubber component of the rubber concentrate.

EXAMPLES

To test the present invention, four rubber concentrates were produced and blended with ABS. Two of the rubber concentrates were made in accordance with the present invention while two were not. In one of the two controls, styrene and acrylonitrile monomer were polymerized with a low molecular weight rubber alone while in the other, the monomers were polymerized with a high molecular weight rubber alone. In the samples in accordance with the present invention, acrylonitrile and styrene monomers were polymerized in the presence of a combination of the same low and high molecular weight rubbers, all in proportions in accordance with the present invention.

The polymerization procedure was basically the same in each case. Ethylbenzene, comprising about 20% of the total solution weight, was used as a solvent for the monomers and the rubber. The solution was maintained at about 105° C. for about two hours. After devolatilization, the four resulting rubbers had the following compositions:

| Sample | % Styrene | % Acrylo-nitrile | % High Molecular Weight Rubber | % Low Molecular Weight Rubber |
|---|---|---|---|---|
| Control 1 | 41 | 18 | 0 | 41 |
| Control 2 | 37 | 16 | 47 | 0 |
| Preferred Embodiment 1 | 42 | 18 | 20 | 20 |
| Preferred Embodiment 2 | 38 | 16 | 30 | 16 |

In all cases, the high molecular weight rubber used was SOLPRENE TM 308 marketed by Phillips Petroleum Company (weight average molecular weight of 200,000) and the low molecular weight rubber used was a liquid styrene-butadiene rubber available from Rubber Research Inc. (weight average molecular weight of 8,000).

These rubber concentrates were then blended with two different ABS polymer compositions. In the blends, 78% ABS polymer composition was blended with 22% of the rubber concentrate. The tensile strength in pounds per square inch, the percent elongation, the Izod impact strength, the Vicat softening point and the melt flow rates were then determined for the two ABS base compositions and for the blends, using standard ASTM test procedures. The results, along with an indication of the percent total rubber content for the base ABS or blend are indicated below in Table 2:

| PROPERTIES AND RUBBER CONTENT OF ABS PRODUCT AND ABS-RUBBER BLENDS | | | | | |
|---|---|---|---|---|---|
| Blend # | Ty | % Elong. | Izod Impact | Vicat | MFR | % Rubber |
| ABS #1 | 7190 | 9.7 | 2.78 | 229.5 | 2.7 | 12 |
| ABS #1 (78%) Control 1 (22%) | 6040 | 3.8 | 2.61 | 229.8 | 2.9 | 18 |
| ABS #1 (78%) Pref. Emb 1 (22%) | 6060 | 6.6 | 5.16 | 228.3 | 2.3 | 18 |
| ABS #2 | 6040 | 8.5 | 4.15 | 235.0 | 1.8 | 15 |
| ABS #2 (78%) Pref. Emb 2 (22%) | 4480 | 9.9 | 7.22 | 231.5 | 1.5 | 21 |
| ABS #2 (78%) Control 2 (22%) | 3985 | 17.3 | 3.85 | 232.0 | 1.2 | 21 |

It can be seen that in all test cases, impact strength of the base ABS resin was substantially improved using rubber concentrates made in accordance with the present invention. Yet, other properties such as melt flow rate were not adversely affected. In the case of blends using control rubber concentrates, no improvement in impact strength was seen. Indeed, impact strength of the base ABS's suffered with addition of the control rubbers.

Naturally, it will be appreciated by those skilled in the art that the broad parameters set forth above for the invention will have to be varied in specific applications in order to maximize the benefits which can be achieved. Further, it is of course understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A method for making an impact resistant, ABS rubber reinforced rigid polymer blend comprising:
   forming a rubber concentrate by polymerizing an acrylonitrile and styrene monomer system in the presence of a mixture of a low molecular weight rubber having a weight average molecular weight of from about 2,000 to about 50,000 and a higher molecular weight rubber having a weight average molecular weight of from about 100,000 to about 400,000;
   blending the rubber concentrate resulting from the foregoing into an ABS polymer blend.

2. The method of claim 1 in which:
   said monomer system and said low and higher molecular weight rubbers are blended in proportions such that the rubber concentrate has a 35 to 95% total rubber content.

3. The method of claim 2 in which:
   the ratio of said low molecular weight rubber to said higher molecular weight rubber is from about 20:80 to about 80:20.

4. The method of claim 3 in which:
   at least about 20% of said rubber concentrate is blended into said ABS polymer blend.

5. The method of claim 3 in which:
   said rubber concentrate is blended with an ABS polymer blend in proportions sufficient to extend the rubber content of said ABS blend by at least about 50%.

6. The method of claim 3 in which:
   the ratio of said styrene monomer to said acrylonitrile monomer is from about 90:10 to about 60:40.

7. The method of claim 6 in which:
   each of said rubbers is a styrene-butadiene elastomer.

8. The method of claim 7 in which:
   the weight average molecular weight of said low molecular weight rubber is about 8,000 and the weight average molecular weight of said higher molecular weight rubber is about 200,000.

9. The method of claim 6 in which:
   at least about 20% of said rubber concentrate is blended into said ABS polymer blend.

10. The method of claim 6 in which:
    said rubber concentrate is blended with an ABS polymer blend in proportions sufficient to extend the rubber content of said ABS blend by at least about 50%.

11. The method of claim 1 in which:
    the ratio of said styrene monomer to said acrylonitrile monomer is from about 90:10 to about 60:40.

12. An ABS polymer blend product made in accordance with the process of claim 1.

13. The product of claim 12 in which:
    said styrene and acrylonitrile monomer system and said low and higher molecular weight rubbers are blended in proportions such that the rubber concentrate has a 35 to 95% total rubber content.

14. The product of claim 13 in which:
    the ratio of said low molecular weight rubber to said higher molecular weight rubber is from about 20:80 to about 80:20.

15. The product of claim 14 in which:
    at least about 20% of said rubber concentrate is blended into said ABS polymer blend.

16. The product of claim 14 in which:
    said rubber concentrate is blended with an ABS polymer blend in proportions sufficient to extend the rubber content of the blend by at least about 50%.

17. The product of claim 14 in which:
    the ratio of said styrene monomer to said acrylonitrile monomer is from about 90:10 to about 60:40.

18. The product of claim 17 in which:
    each of said rubbers is a styrene-butadiene elastomer.

19. The product of claim 18 in which:
    the weight average molecular weight of said low molecular weight rubber is about 8,000 and the weight average molecular weight of said higher molecular weight rubber is about 200,000.

20. The product of claim 17 in which:
    at least about 20% of said rubber concentrate is blended into said ABS polymer blend.

21. The product of claim 17 in which:
    said rubber concentrate is blended with an ABS polymer blend in proportions sufficient to extend the rubber content of the blend by at least about 50%.

22. The product of claim 12 in which:
    the ratio of said styrene monomer to said acrylonitrile monomer is from about 90:10 to about 60:40.

* * * * *